United States Patent
Parsian et al.

(10) Patent No.: US 11,994,915 B1
(45) Date of Patent: May 28, 2024

(54) RETENTION MECHANISMS FOR COUPLED DEVICES

(71) Applicant: Apple Inc., Cupertino, CA (US)

(72) Inventors: Mohammadali Parsian, San Mateo, CA (US); Nicholas Joseph Ross, Windsor, CO (US); Patrick Griffin Skovsted, Fort Collins, CO (US); John Patrick Fitzgerald, Fort Collins, CO (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/531,608

(22) Filed: Nov. 19, 2021

Related U.S. Application Data (60) Provisional application No. 63/143,626, filed on Jan. 29, 2021.

(51) Int. Cl.
| | |
|---|---|
| G06F 1/16 | (2006.01) |
| G06F 3/0354 | (2013.01) |
| G06F 3/039 | (2013.01) |
| H02J 50/10 | (2016.01) |

(52) U.S. Cl.
CPC ........ *G06F 1/1656* (2013.01); *G06F 3/03545* (2013.01); *G06F 3/039* (2013.01); *H02J 50/10* (2016.02)

(58) Field of Classification Search
CPC .... G06F 1/1656; G06F 3/03545; G06F 3/039; H02J 50/10
See application file for complete search history.

(56) References Cited

U.S. PATENT DOCUMENTS

| | | | | |
|---|---|---|---|---|
| 11,429,144 | B2 * | 8/2022 | Chuang | G06F 1/1607 |
| D987,638 | S * | 5/2023 | He | D14/411 |
| 11,775,022 | B1 * | 10/2023 | Troedson | G06F 1/1626 |
| | | | | 206/586 |
| 2006/0174139 | A1 * | 8/2006 | Keely | G06F 1/3203 |
| | | | | 713/300 |
| 2015/0153783 | A1 | 6/2015 | Corbin et al. | |
| 2015/0277500 | A1 * | 10/2015 | Turowski | G06F 3/03545 |
| | | | | 361/679.56 |
| 2017/0068339 | A1 | 3/2017 | Zimmerman et al. | |
| 2020/0089340 | A1 | 3/2020 | Ruscher et al. | |

* cited by examiner

*Primary Examiner* — Stephen G Sherman
(74) *Attorney, Agent, or Firm* — BAKERHOSTETLER (57) ABSTRACT

A case can provide a mechanism for securely retaining a stylus with a host device while the stylus is not in use. Such a mechanism can maintain the alignment of the stylus with the host device for attachment, power transfer, and/or communication. The mechanism can further protect the stylus from impact or other external influences. The same mechanism can transition to a lower profile while not retaining the stylus (e.g., while the stylus is in use as an input device for the host device). Such a mechanism can selectably be placed into a configuration that substantially conceals the mechanism, such that it can temporarily appear to be a case or portion of the host device that does not necessarily have a dedicated receptacle for retaining the stylus.

18 Claims, 9 Drawing Sheets

RETENTION MECHANISMS FOR COUPLED DEVICES

CROSS-REFERENCE TO RELATED APPLICATION

This application claims the benefit of U.S. Provisional Application No. 63/143,626, entitled "RETENTION MECHANISMS FOR COUPLED DEVICES," filed Jan. 29, 2021, the entirety of which is incorporated herein by reference.

TECHNICAL FIELD

The present description relates generally to electronic devices, and, more particularly, to a stylus that can be coupled to a host device.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

The stylus can be stored with the electronic device (e.g., host device) when not in use. For example, the host device can include or be accompanied by a case or other structure that provides a receptacle for securely retaining the stylus. This can help protect the stylus from damage while maintaining the stylus with the host device for access when desired by a user. However, while the stylus is in use, such a receptacle may be unused and undesirable, as it may occupy space and enlarge the overall size of the host device or case.

In accordance with embodiments disclosed herein, a mechanism can be provided for securely retaining a stylus with a host device while not in use. Such a mechanism can maintain the alignment of the stylus with the host device for attachment, power transfer, and/or communication. The mechanism can further protect the stylus from impact or other external influences. The same mechanism can transition to a lower profile while not retaining the stylus (e.g., while the stylus is in use as an input device for the host device). Such a mechanism can selectably be placed into a configuration that substantially conceals the mechanism, such that it can temporarily appear to be a case or portion of the host device that does not necessarily have a dedicated receptacle for retaining the stylus.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
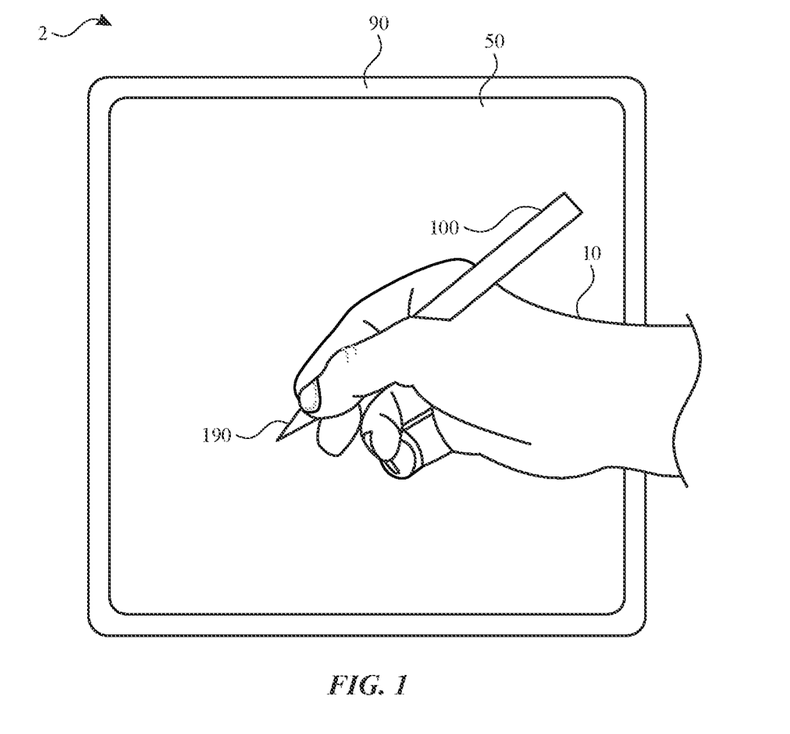
FIG. 1 illustrates a view of a system including a stylus and a host device, according to some embodiments of the subject technology.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 2 including a stylus 100 and a host device 90 having a surface 50, according to some embodiments of the subject technology. The stylus 100 can be held by a user 10 and operate as a touch-based input device for use with the host device 90.

The surface 50 of the host device 90 can include a display surface and/or a touch panel for interacting with the stylus 100 when contacted thereby. The host device 90 utilizes the display to render images to convey information to the user. The display can be configured to show text, colors, line drawings, photographs, animations, video, and the like. The surface 50 of the host device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the host device 90 and/or the stylus 100. For example, the stylus 100 can include one or more sensors that detect when the tip 190 contacts and applied pressure to the surface 50. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface 50. Such sensors can optionally operate cooperatively with the host device 90 to detect contact with the surface 50. In use, a user may manipulate the stylus 100 and apply a force to a surface 50 of the host device 90. A corresponding reaction force may be transferred through the tip 190 of the stylus 100 connected to an electromechanical coupling and to the sensor of the stylus 100. The sensor, or a portion thereof, may deform in response, which may be measured and used to estimate the applied force. The sensor can be used to produce a non-binary output that corresponds to the applied force. For example, the sensor can be used to produce an output that represents a magnitude that varies in accordance with a variable amount of applied force.

The stylus can include one or more other sensors and/or input module for facilitating interaction by a user. For example, the stylus 100 can include a touch sensor that can be provided to detect contact by a user on a grip region of the housing of the stylus 100. The touch sensor can include a capacitive touch sensor. The touch sensor can include multiple sensing elements, such as conductive electrodes, to detect contact and changes in contact at multiple locations.

Figure 2:
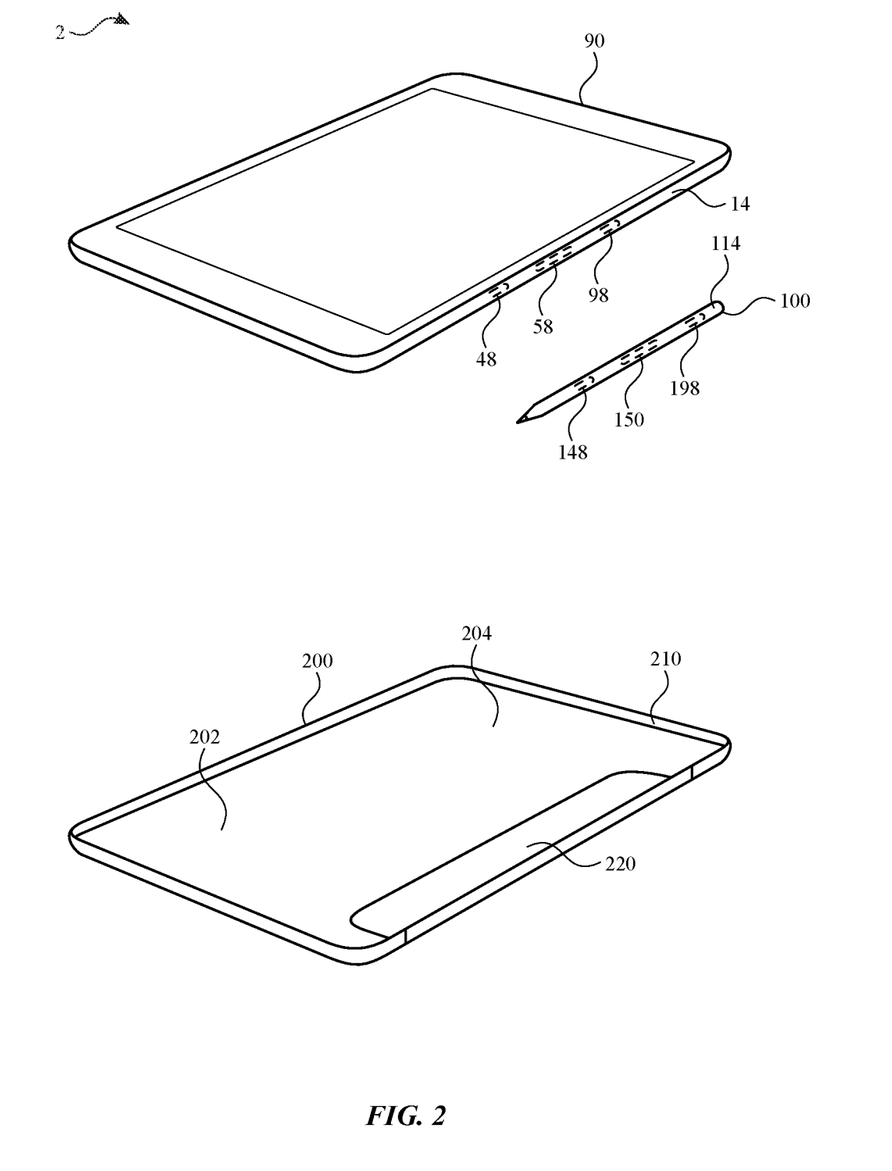
FIG. 2 illustrates a perspective view of a host device, a stylus, and a case, according to some embodiments of the subject technology.

Referring now to FIG. 2, use of the stylus with a host device and a case can provide wireless charging for the stylus. As shown in FIG. 2, a stylus power module 150 within the housing of the stylus 100 and multiple stylus magnets 148 and 198 positioned on opposite sides of the stylus power module 150. The stylus power module 150 and the multiple stylus magnets 148 and 198 can be positioned on a same radial side of the stylus 100 and adjacent to an engagement portion 114 of the housing. For example, the engagement portion 114 can be flat or otherwise provide a shape that is complementary to a shape of an engagement portion 14 of the host device 90. It will be understood that additional stylus magnets can optionally be included, and that the stylus magnets can be provided in other arrangements, such as on a same longitudinal side of the stylus power module 150.

The stylus magnets 148 and 198 provide magnetic coupling to corresponding host magnets 48 and 98 of the host device 90. As further shown in FIG. 2, a host power module 58 is provided by the host device 90. The host magnets 48 and 98 can be positioned on opposite sides of the host power module 58. The stylus power module 150 and the multiple stylus magnets 148 and 198 can be positioned adjacent to an engagement portion 14 of the host device 90. The host power module 58 and the host magnets 48 and 98 can be positioned so that, when the stylus magnets 148 and 198 are aligned with the host magnets 48 and 98, the stylus power module 150 is aligned with the stylus power module 150 of the host device 90. It will be understood that additional host magnets can optionally be included, and that the host magnets can be provided in other arrangements, such as on a same longitudinal side of the host power module 58.

As further shown in FIG. 2, a case 200 can be provided to surround at least a portion of the host device 90 and provide a receptacle for securely retaining the stylus 100 against the engagement portion 14 of the host device 90. While the features of the case 200 can be provided as a structure that is easily removable from the host device 90, it will be understood that the features described herein can be integrated into the host device 90, such as with an outer housing of the host device 90. Accordingly, the features of the case 200 can be provided as a separable item or an integrated into the host device 90.

The case 200 can include a main body 204 that can include a rear cover 202 and a lip 210. The rear cover 202 can be configured to extend across at least a portion of a rear side of the host device 90. The rear cover 202 can be flat or another shape that substantially conforms to the rear side of the host device 90. The lip 210 that extends from peripheral edges of the rear cover 202. The lip 210 can be configured to extend around at least some of the sides of the host device 90. Optionally, the lip 210 can extend around the sides of the host device 90 to engage a front side of the host device 90 for secure retention of the host device 90 within the case 200. Accordingly, the rear cover 202 and the lip 210 can form a recess into which host device 90 can rest.

While the case 200 is shown on a rear side of the host device 90, it will be understood that the case 200, or a portion thereof, can extend over the front side of the host device 90, such as with a removable cover to protect the screen of the host device. The features of the case 200 can be provide at any portion of the case 200, including along the rear or front sides of the host device 90.

As further shown in FIG. 2, the case 200 can include a main body 204 and a tray 220. The tray 220 can extend along and/or aligned with at least a portion of the rear cover 202 and at least a portion of the lip 210 in at least one configuration thereof. For example, the tray 220 can be positioned on a side of the case 200 that is configured to align with the engagement portion 14 of the host device 90. The tray 220 can be transition of all between a variety of configurations to selectively allow access of the stylus to the engagement portion 14, as discussed further herein.

Referring now to FIGS. 3-6, a case can include a tray that transitions between different configurations to alternatively provide a low-profile shape and provide a receptacle for securely retaining a stylus.

Figure 3:
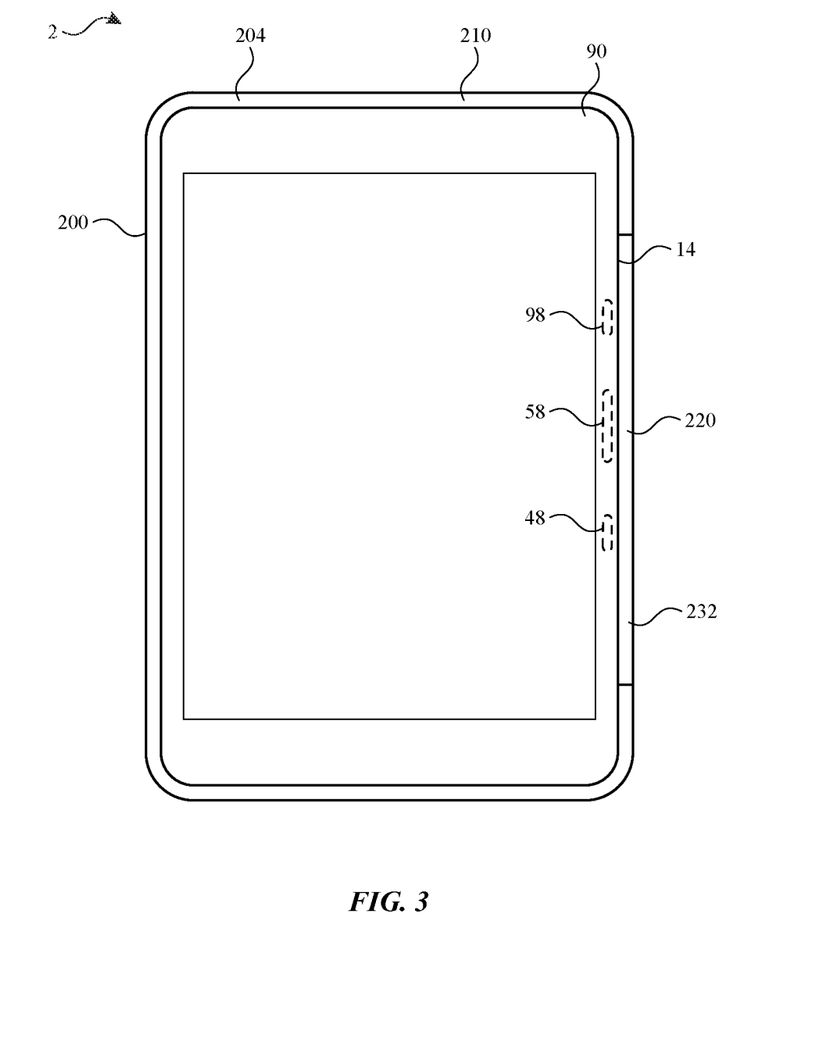
FIG. 3 illustrates a front view of a host device in a case with a tray of the case being in a retracted configuration, according to some embodiments of the subject technology.

As shown in FIG. 3, a case 200 can surround at least a portion of a host device 90. The case 200 can include the lip 210 and a tray 220 along at least an engagement portion 14 of the host device. While in a retracted configuration, the tray 220 can be in a first position against the main body 204 and/or the engagement portion 14 of the host device 90. Optionally, while the tray 220 is in the retracted configuration, a surface of the tray 220 can be flush with a surface of the main body 204. For example, a wall 232 of the tray 220 can be flush with the lip 210. By further example, while the tray 220 is in the retracted configuration, the opposing sides of the case 200, including the side formed by the tray 220, can be symmetrical. As such, the case 200 can form a low-profile shape such that the tray 220 need not be prominent or recognizable as other than a portion of a continuous structure provided by the case 200.

Figure 4:
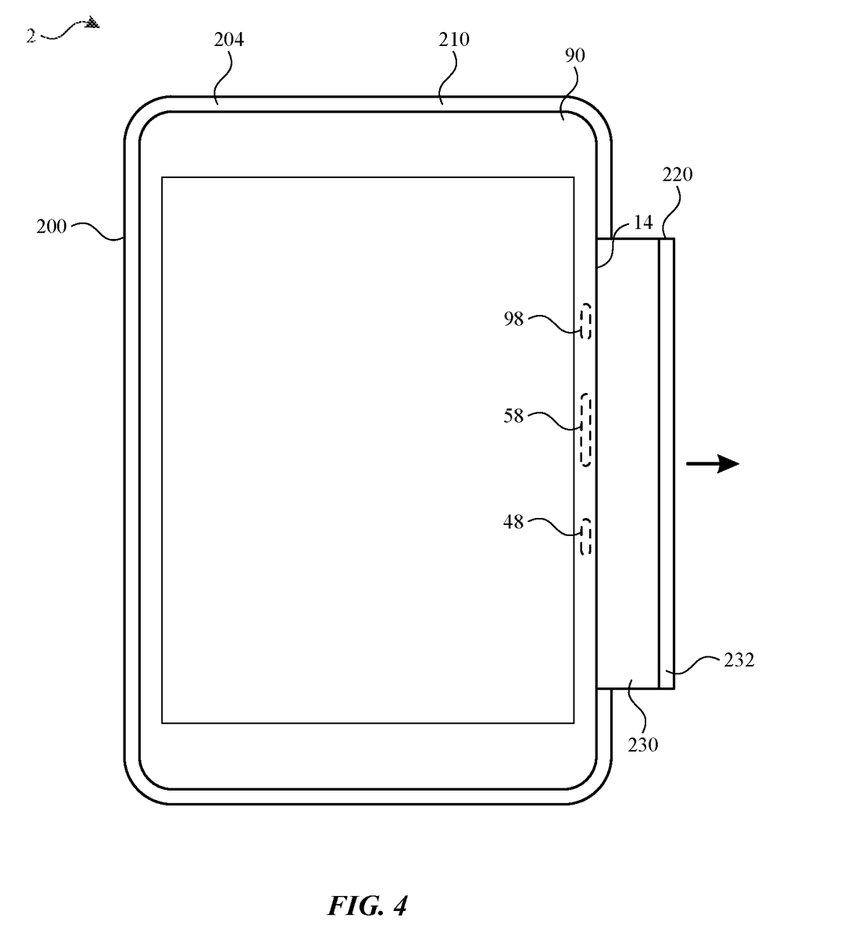
FIG. 4 illustrates a front view of the host device in the case of FIG. 3 with the tray of the case being in an extended configuration, according to some embodiments of the subject technology.

As shown in FIG. 4, the tray 220 can be extended away from the main body 204 and the host device 90 to an extended configuration. To reach the extended configuration, the tray 220 can move past a securing configuration, with the tray 220 in a second position as discussed further herein. In the extended configuration, the tray 220 can be in a third position with respect to the main body 204 and/or the host device 90. While the tray 220 is in the extended configuration, the wall 232 of the tray 220 can be positioned away from the engagement portion 14 to expose a base 230 of the tray 220. The base can move from behind the host device 90 to provide a surface to help receive a stylus.

While the tray 220 is in the extended configuration, the tray 220 can be biased to transition from the extended configuration to the securing configuration, as described further herein. For example, the tray 220 may achieve and/or maintain the extended configuration only upon application of an external force (e.g., from a user).

Figure 5:
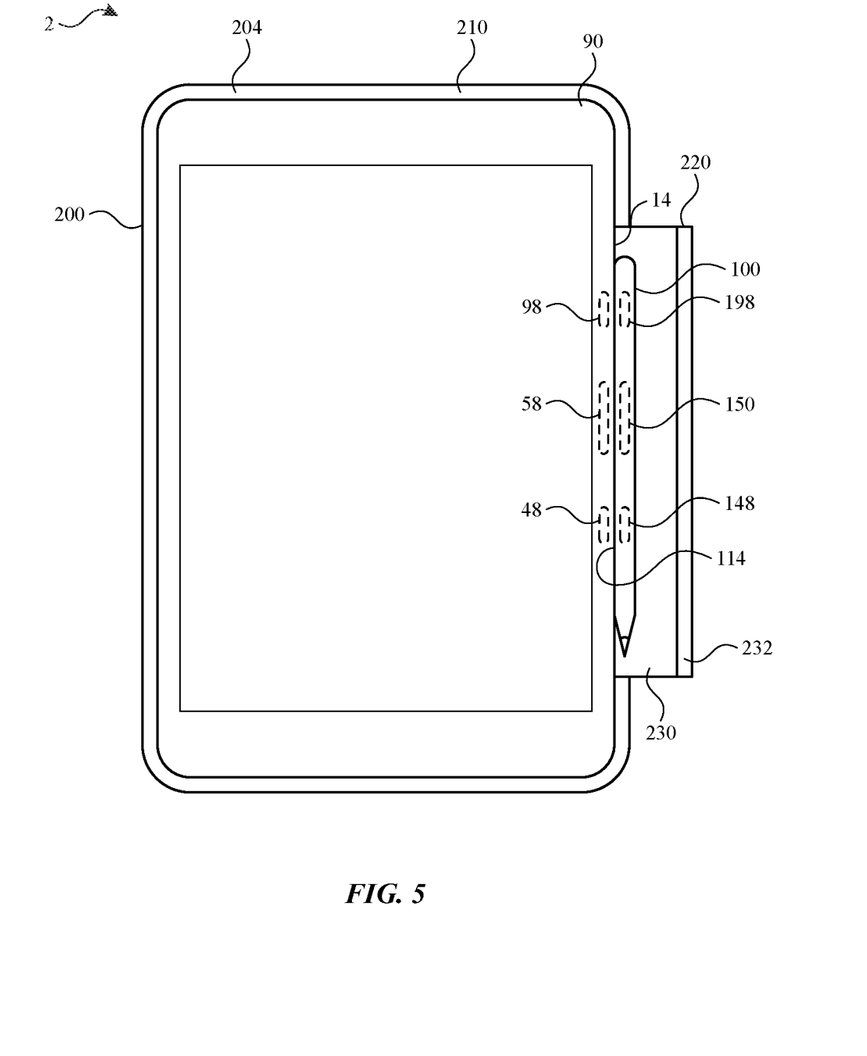
FIG. 5 illustrates a front view of the host device in the case of FIG. 4 and a stylus with the tray of the case being in the extended configuration, according to some embodiments of the subject technology.

As shown in FIG. 5, while the tray 220 is in the extended configuration, the stylus 100 can be received within a receptacle formed, at least in part, by the tray 220. The stylus 100 can be provided while the tray 220 is in the extended configuration so that adequate space and clearance is provided. For example, structures (e.g., of the tray 220) provided for later retention of the stylus 100 can be moved sufficiently far away in the extended configuration so that they do not restrict entry of the stylus 100.

Figure 6:
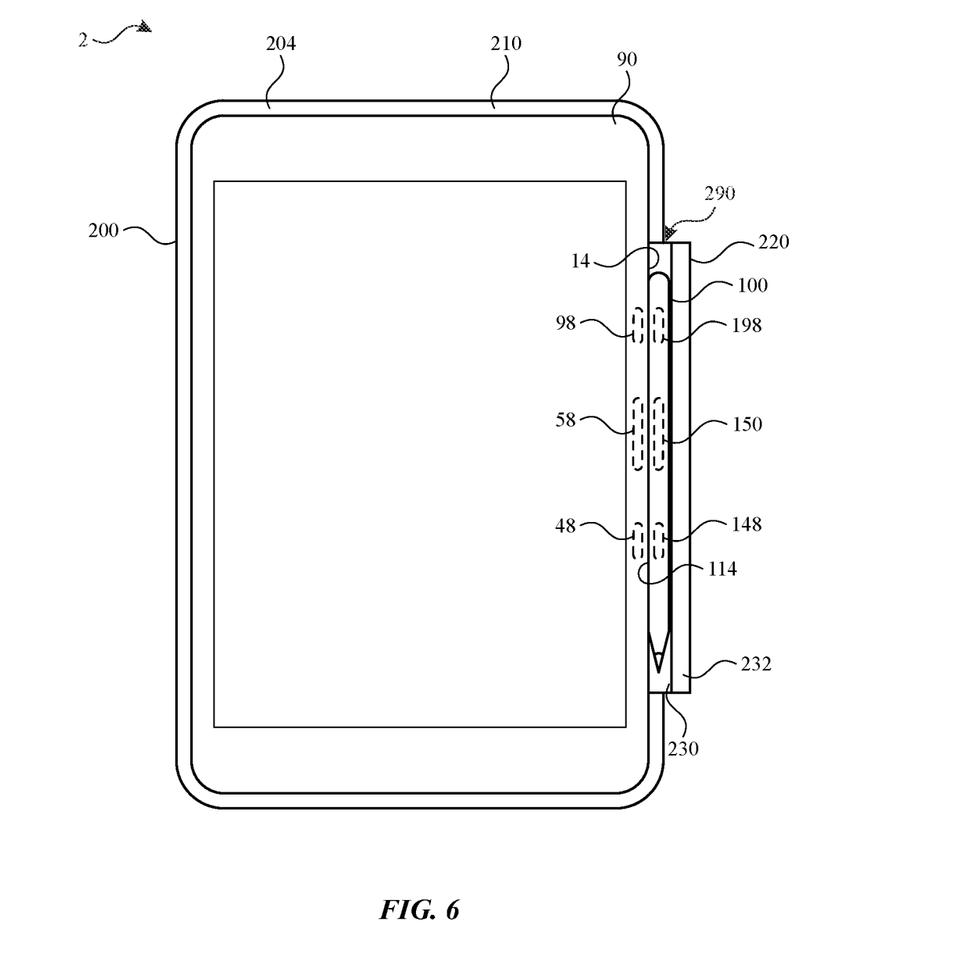
FIG. 6 illustrates a front view of the host device in the case and the stylus of FIG. 5 with the tray of the case being in a securing configuration, according to some embodiments of the subject technology.

As shown in FIG. 6, the tray 220 can retract to the securing configuration to securely retain the stylus 100. The tray 220 can form, at least in part, a receptacle 290 within which the stylus 100 can be retained against the engagement portion 14 of the host device 90. While in the securing configuration, the tray 220 can be in the second position, which is between the first position (while in the retracted configuration) and the third position (while in the extended configuration).

The stylus can be retained by the tray 220 as well as the host device 90. For example, the stylus magnets 148 and 198 of the stylus 100 can provide magnetic coupling to corresponding host magnets 48 and 98 of the host device 90, in addition to the retention forces applied by the tray 220.

While the magnetic coupling can resist movement of the stylus 100 in at least one direction, the tray 220 can resist movement of the stylus 100 in the same and/or at least one other direction. For example, the tray 220 can resist movement of the stylus 100 laterally across the engagement portion 14 of the host device 90. Such retention can be achieved, for example, by providing a shape (e.g., of the wall 232) that conforms to and/or otherwise partially wraps around the body of the stylus. By further example, where the stylus can have a convex shape on its outer surface, the tray 220 (e.g., at the wall 232) can have a concave shape that complements the outer surface of the stylus 100.

The tray 220 can be biased to the securing configuration, such that the stylus 100 is securely retained until the tray 220 is moved from the securing configuration to the extended configuration by an applied external force. For example, the user can release the stylus by sliding the tray 220 away from the host device 90 and removing the stylus 100 from the receptacle 290. The removal can be facilitated by clearances to grasp the stylus 100 and/or with openings (e.g. in the tray 220) to apply a force to urge the stylus 100 in a direction across and/or away from the engagement portion 14 of the host device 90.

Figure 7:
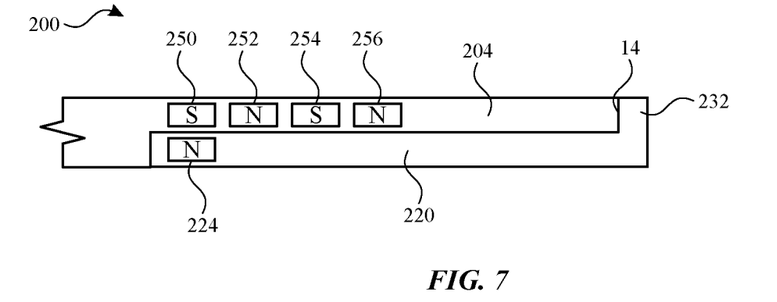
FIG. 7 illustrates a sectional view of a case with a tray of the case being in a retracted configuration, according to some embodiments of the subject technology.
Figure 8:
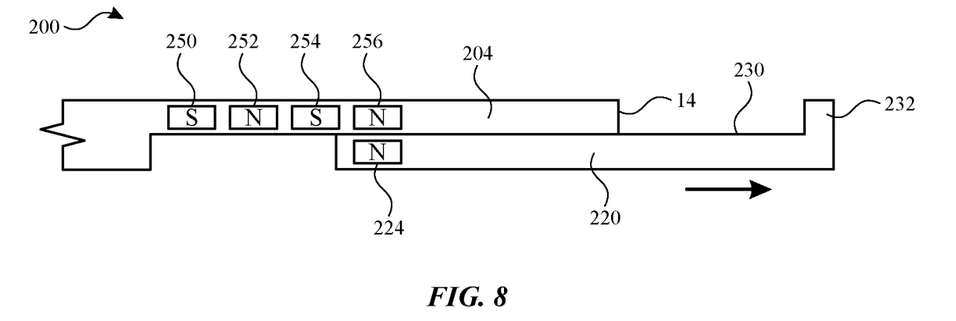
FIG. 8 illustrates a schematic view of the case of FIG. 7 with the tray of the case being in an extended configuration, according to some embodiments of the subject technology.
Figure 9:
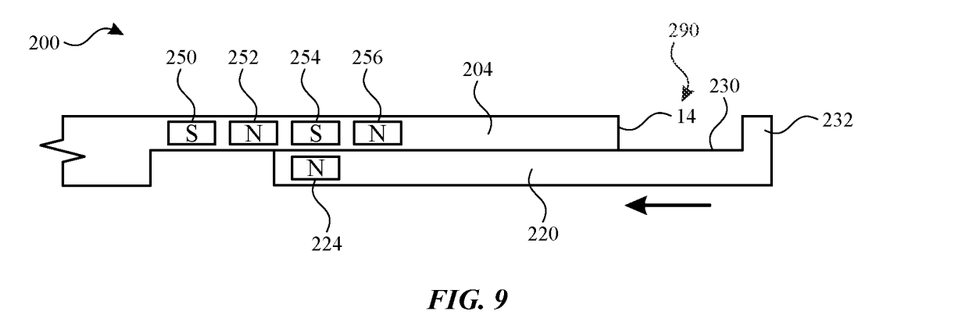
FIG. 9 illustrates a schematic view of the case of FIG. 8 with the tray of the case being in a securing configuration, according to some embodiments of the subject technology.

Referring now to FIGS. 7-9, a case can include a magnetic detent system to facilitate sliding of a tray between different configurations.

As shown in FIG. 7, a case 200 can include an array of magnets in a main body 204 and at least one magnet in the tray 220. The array of magnets can include primary magnets 250, 252, 254, and 256. While four primary magnets are shown, it will be understood that any number of primary magnets can be provided.

The tray 220 can include a secondary magnet 224. While only one secondary magnet is shown, it will be understood that any number of secondary magnets can be provided. The secondary magnet 224 can interact with the primary magnets based on relative magnetic polarity arrangements. For example, the secondary magnet 224 can be either attracted by or repelled by a closed one of the primary magnets, which can be determined by the slidable configuration of the tray 220.

For example, while the tray 220 is in the retracted configuration of FIG. 7, the secondary magnet 224 can be closest to the primary magnet 250 at an end of the array of primary magnets. The configuration of FIG. 7 can correspond to the configuration shown in FIG. 3. The polarities of the secondary magnet 224 and the primary magnet 250 can be such that they magnetically attract each other. As such, the tray 220 can be biased to remain stably in the retracted configuration until an external force is applied to the tray 220. For example, an applied force can overcome the magnetic repulsion between the secondary magnet 224 and the primary magnet 252.

As shown in FIG. 8, the tray 220 can be moved to the extended configuration. The configuration of FIG. 8 can correspond to the configuration shown in FIGS. 4 and 5. While the tray 220 is in the extended configuration, the secondary magnet 224 can be closest to the primary magnet 256 at another end of the array of primary magnets. As such, the tray 220 can be biased to move away from the extended configuration and at least to the securing configuration. However, the tray 220 can remain in the extended configuration while an external force is applied to the tray 220.

As shown in FIG. 9, the tray 220 can move to the securing configuration. The configuration of FIG. 9 can correspond to the configuration shown in FIG. 6. While the tray 220 is in the securing configuration, the secondary magnet 224 can be closest to the primary magnet 254, which can magnetically attract the secondary magnet 224. As such, the tray 220 can be biased to remain stably in the securing configuration until an external force is applied to the tray 220. Such a force can be applied in either of two directions (e.g., toward the extended configuration to help remove the stylus or toward the retracted configuration after the stylus is removed).

While the main body 204 is shown with the array of primary magnets 250, 252, 254, and 256 and the tray 220 is shown with the secondary magnet 224, it will be understood that the arrangement can be different. For example, the main body 204 can provide the secondary magnet 224 and the tray 220 can provide the array of primary magnets 250, 252, 254, and 256.

Figure 10:
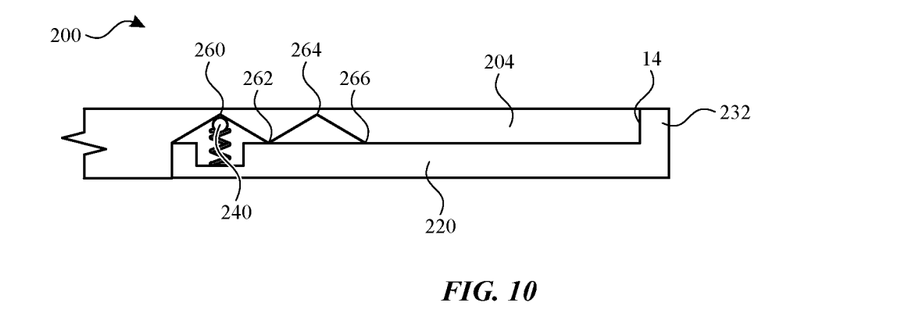
FIG. 10 illustrates a sectional view of a case with a tray of the case being in a retracted configuration, according to some embodiments of the subject technology.
Figure 11:
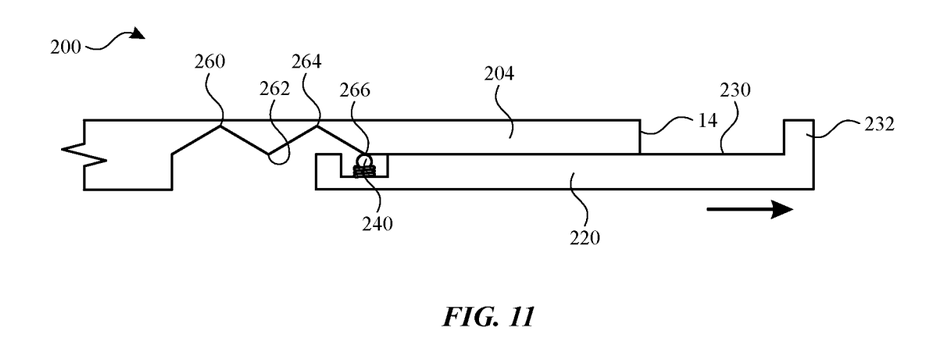
FIG. 11 illustrates a schematic view of the case of FIG. 10 with the tray of the case being in an extended configuration, according to some embodiments of the subject technology.
Figure 12:
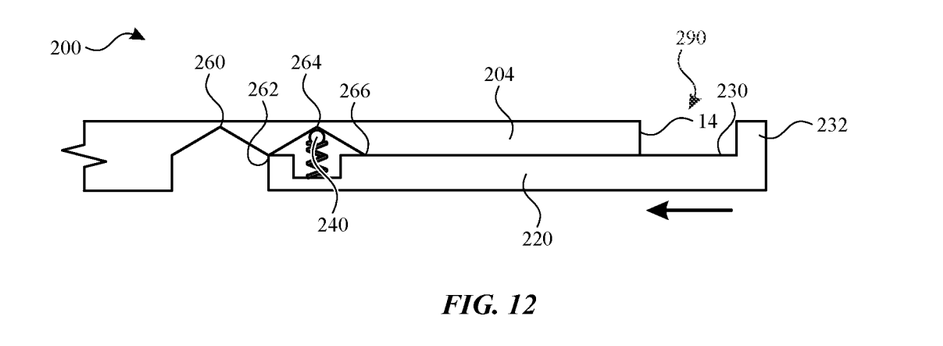
FIG. 12 illustrates a schematic view of the case of FIG. 11 with the tray of the case being in a securing configuration, according to some embodiments of the subject technology.

Referring now to FIGS. 10-12, a case can include a mechanical detent system to facilitate sliding of a tray between different configurations.

As shown in FIG. 10, a case 200 can include a pattern of indentations in a main body 204 and at least one detent mechanism in the tray 220. The pattern of indentations can include one or more peaks 262 and 266 and one or more indentations 260 and 264.

The tray 220 can include a spring-loaded mechanical detent 240. The spring-loaded mechanical detent 240 can interact with the pattern of indentations based on relative alignment. For example, the spring-loaded mechanical detent 240 can expand into the indentations or be compressed by the peaks. The alignment of the spring-loaded mechanical detent 240 can be based on the slidable configuration of the tray 220.

For example, while the tray 220 is in the retracted configuration of FIG. 10, the spring-loaded mechanical detent 240 can be expanded into the indentation 260. The configuration of FIG. 10 can correspond to the configuration shown in FIG. 3. The bias of the spring-loaded mechanical detent 240 can such that it requires an externally applied force to compress the detent and move out of the indentation 260. As such, the tray 220 can be biased to remain stably in the retracted configuration until an external force is applied to the tray 220. For example, an applied force can overcome the spring bias to allow the tray 220 to move.

As shown in FIG. 11, the tray 220 can be moved to the extended configuration. The configuration of FIG. 11 can correspond to the configuration shown in FIGS. 4 and 5. While the tray 220 is in the extended configuration, the spring-loaded mechanical detent 240 can abut the peak 266. As such, the tray 220 can be biased to move away from the extended configuration and at least to the securing configuration. However, the tray 220 can remain in the extended configuration while an external force is applied to the tray 220.

As shown in FIG. 12, the tray 220 can move to the securing configuration. The configuration of FIG. 12 can correspond to the configuration shown in FIG. 6. While the tray 220 is in the securing configuration, the spring-loaded mechanical detent 240 can be expanded into the indentation 264. As such, the tray 220 can be biased to remain stably in the securing configuration until an external force is applied to the tray 220. Such a force can be applied in either of two directions (e.g., toward the extended configuration to help remove the stylus or toward the retracted configuration after the stylus is removed).

While the main body 204 is shown with the pattern of indentations and the tray 220 is shown with the spring-loaded mechanical detent, it will be understood that the arrangement can be different. For example, the main body 204 can provide the spring-loaded mechanical detent and the tray 220 can provide the pattern of indentations.

Figure 13:
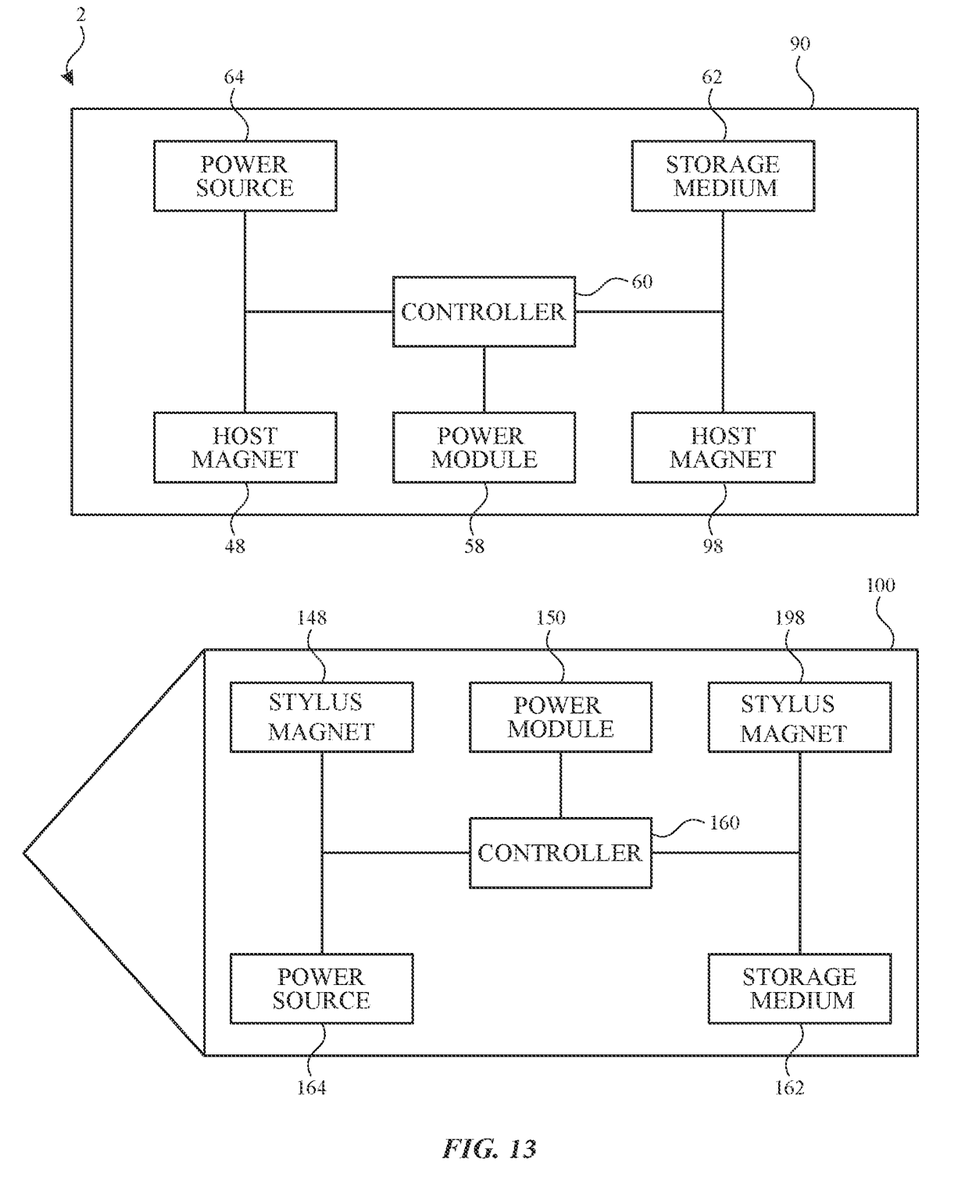
FIG. 13 illustrates a block diagram showing a stylus and a host device, according to some embodiments of the subject technology.

As shown in FIG. 13, the host device 90 can include a controller 60 and a non-transitory storage medium 62. The non-transitory storage medium 62 can include, for example, a magnetic storage medium, optical storage medium, magneto-optical storage medium, read-only memory, random access memory, erasable programmable memory, flash memory, or combinations thereof. According to some embodiments, the controller 60 can execute one or more instructions stored in the non-transitory storage medium 62 to perform one or more functions.

The host device 90 can include a power source 64, such as one or more batteries and/or power management units. The host device 90 can include components for charging the power source 64, such as a host power module 58, and/or for charging other devices, such as the stylus 100. The host power module 58 can include one or more components for receiving and/or transmitting power wirelessly (e.g., inductively), for example to the stylus 100.

The host device 90 can include host magnets 48 and 98, as discussed herein. The host magnets 48 and 98 can be passive or actively controlled magnets (e.g., electromagnets). The host magnets can be part of or include a retention mechanism such as those discussed further herein. The host power module 58 and the host magnets 48 and 98 can be positioned so that, when the stylus magnets 148 and 198 are aligned with the host magnets 48 and 98, the stylus power module 150 is aligned with the stylus power module 150 of the host device 90.

As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), ferrite, AlNiCo, iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials.

The host device 90 can include a communication component (not shown) for communicating with the host device 90 and/or another device. The communication component can be part of or include the host power module 58. For example, a signal can be encoded with power transmissions to and/or from the host power module 58. The communication component can include one or more wired or wireless components, WiFi components, near field communication components, Bluetooth components, and/or other communication components. The communication component can include one or more transmission elements, such as one or more antennas. Alternatively or in combination, the communication component can include an interface for a wired connection to the host device 90 and/or another device.

The host device 90 can also include components that facilitate operation with the stylus 100. For example, the host device 90 can include one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on.

As further shown in FIG. 13, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions.

The stylus 100 can include a power source 164, such as one or more batteries and/or power management units. The stylus 100 can include components for charging the power source 164, such as a stylus power module 150, from the host device 90. The stylus power module 150 can include one or more components for receiving and/or transmitting power wirelessly (e.g., inductively), for example from the host device 90.

It will be understood that the host device 90 and/or the stylus 100 can share information, such that detections by one can be communicated to the other for use as described herein. It will be understood that where the host device 90 and/or the stylus 100 omits any component provided by the other, the function of such a component can be achieved by sharing information.

The stylus 100 can include stylus magnets 148 and 198, as discussed herein. The stylus magnets 148 and 198 can be passive or actively controlled magnets (e.g., electromagnets). The stylus magnets can be part of or include a retention mechanism such as those discussed further herein. The stylus power module 150 and the stylus magnets 148 and 198 can be positioned so that, when the stylus magnets 148 and 198 are aligned with the host magnets 48 and 98, the stylus power module 150 is aligned with the host power module 58 of the host device 90.

The stylus 100 can include a communication component (not shown) for communicating with the host device 90 and/or another device. The communication component can be part of or include the stylus power module 150. For example, a signal can be encoded with power transmissions to and/or from the stylus power module 150. The communication component can include one or more wired or wireless components, WiFi components, near field communication components, Bluetooth components, and/or other communication components. The communication component can include one or more transmission elements, such as one or more antennas. Alternatively or in combination, the communication component can include an interface for a wired connection to the host device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can include a haptic feedback component that provides haptic feedback with tactile sensations to the user. The haptic feedback component can be implemented as any suitable device configured to provide force feedback, vibratory feedback, tactile sensations, and the like. For example, in one embodiment, the haptic feedback component may be implemented as a linear actuator configured to provide a punctuated haptic feedback, such as a tap or a knock. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can quantify or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the host device 90 to adjust or update the operation thereof.

Accordingly, in accordance with embodiments disclosed herein, a mechanism can be provided for securely retaining a stylus with a host device while not in use. Such a mechanism can maintain the alignment of the stylus with the host device for attachment, power transfer, and/or communication. The mechanism can further protect the stylus from impact or other external influences. The same mechanism can transition to a lower profile while not retaining the stylus (e.g., while the stylus is in use as an input device for the host device). Such a mechanism can selectably be placed into a configuration that substantially conceals the mechanism, such that it can temporarily appear to be a case or portion of the host device that does not necessarily have a dedicated receptacle for retaining the stylus.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the host device can be any device that interacts with a touch-based input device. For example, a host device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Accordingly, although the invention has been described with respect to specific embodiments, it will be appreciated that the invention is intended to cover all modifications and equivalents within the scope of the following claims.

Various examples of aspects of the disclosure are described below as clauses for convenience. These are provided as examples, and do not limit the subject technology.

Clause A: a case comprising: a main body comprising: a rear cover; and a lip extending from the rear cover, the rear cover and the lip defining a recess for surrounding at least a portion of a host device; and a tray movably coupled to the main body and comprising: a base; and a wall, wherein the tray is movable relative to the main body to form a receptacle for receiving a stylus such that the stylus abuts the wall, the base, and an engagement portion of the host device.

Clause B: a case comprising: a main body for surrounding at least a portion of a host device; a tray configured to slide relative to the main body between: a retracted configuration with the tray in a first position against the main body; a securing configuration with the tray in a second position away from the main body for securing a stylus against an engagement portion of the host device; and an extended configuration with the tray in a third position away from the main body, wherein the second position is between the first position and the third position, wherein the tray is biased to transition from the extended configuration to the securing configuration.

Clause C: a case comprising: a main body; a tray configured to slide relative to the main body; an array of primary magnets arranged in an alternating magnetic polarity pattern; and a secondary magnet configure to move across the array of primary magnets as the tray slides relative to the main body, wherein one of the primary magnets at a first end of the array is configured to magnetically attract the secondary magnet, and one of the primary magnets at a second end of the array is configured to magnetically repel the secondary magnet.

One or more of the above clauses can include one or more of the features described below. It is noted that any of the following clauses may be combined in any combination with each other, and placed into a respective independent clause, e.g., clause A, B, or C.

Clause 1: a length of the tray extending along the engagement portion of the host device is at least as long as a length of the stylus.

Clause 2: the tray is moveable relative to the main body between: a retracted configuration with the tray in a first position against the engagement portion of the host device; a securing configuration with the tray in a second position forming the receptacle; and an extended configuration with the tray in a third position away from the engagement portion of the host device, wherein the second position is between the first position and the third position.

Clause 3: the tray further comprises a tray magnet; the main body further comprises: a first magnet configured to attract the tray magnet; a second magnet configured to attract the tray magnet; and a third magnet configured to repel the tray magnet.

Clause 4: the tray further comprises a spring-loaded mechanical detent; the main body further comprises: a first indentation into which the spring-loaded mechanical detent can extend while the tray abuts the main body; a second indentation into which the spring-loaded mechanical detent can extend while the tray forms the receptacle; and a protrusion on a side of the second indentation that is opposite the first indentation.

Clause 5: the stylus comprises: a stylus magnet; and a stylus power module; the host device comprises: a host magnet covered by the engagement portion; and a host power module covered by the engagement portion; and when the stylus magnet is aligned with the host magnet, the stylus power module is aligned with the host power module.

Clause 6: while the tray is in the retracted configuration, a surface of the tray is flush with a surface of the main body.

Clause 7: the main body and the tray form a detent mechanism to provide a releasably secure arrangement at the retracted configuration and the securing configuration.

Clause 8: the detent mechanism comprises magnets at the main body and the tray.

Clause 9: the detent mechanism comprises a spring-loaded mechanical detent between the main body and the tray.

Clause 10: the tray further comprises a tray magnet; the main body further comprises: a first magnet configured to attract the tray magnet while the tray is in the retracted configuration; a second magnet configured to attract the tray magnet while the tray is in the securing configuration; and a third magnet configured to repel the tray magnet while the tray is in the extended configuration.

Clause 11: the secondary magnet is aligned with the one of the primary magnets at the first end of the array when the tray abuts the main body.

Clause 12: a surface of the tray is flush with a surface of the main body when the secondary magnet is aligned with the one of the primary magnets at the first end of the array.

Clause 13: the secondary magnet is aligned with and magnetically attracted to another one of the primary magnets while the tray forms a receptacle.

Clause 14: the primary magnets comprise at least four magnets.

Clause 15: the main body comprises: a rear cover; and a lip extending from the rear cover, the rear cover and the lip defining a recess for surrounding at least a portion of a host device; and the tray comprises: a base; and a wall, wherein the tray is movable relative to the main body to form a receptacle for receiving a stylus such that the stylus abuts the wall, the base, and an engagement portion of the host device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A case comprising:
   a main body comprising:
      a rear cover; and
      a lip extending from the rear cover, the rear cover and the lip defining a recess for surrounding at least a portion of a host device; and
   a tray movably coupled to the main body and comprising:
      a base; and
      a wall, wherein the tray is movable relative to the main body to form a receptacle for receiving a stylus such that the stylus abuts the wall, the base, and an engagement portion of the host device,
   wherein the main body and the tray form a detent mechanism to provide a releasably secure arrangement at:
      a retracted configuration with the tray against the main body; and
      a securing configuration with the tray away from the main body for securing the stylus against the engagement portion.

2. The case of claim 1, wherein a length of the tray extending along the engagement portion of the host device is at least as long as a length of the stylus.

3. The case of claim 1, wherein the tray is moveable relative to the main body between:
   the retracted configuration with the tray in a first position;
   the securing configuration with the tray in a second position; and an extended configuration with the tray in a third position away from the engagement portion of the host device, wherein the second position is between the first position and the third position.

4. The case of claim 1, wherein the detent mechanism comprises:
a tray magnet at the tray;
a first magnet at the main body and being configured to attract the tray magnet;
a second magnet at the main body and being configured to attract the tray magnet; and
a third magnet at the main body and being configured to repel the tray magnet.

5. The case of claim 1, wherein the detent mechanism comprises:
a spring-loaded mechanical detent at the tray;
a first indentation at the main body and into which the spring-loaded mechanical detent can extend while the tray abuts the main body;
a second indentation at the main body and into which the spring-loaded mechanical detent can extend while the tray forms the receptacle; and
a protrusion at the main body and on a side of the second indentation that is opposite the first indentation.

6. The case of claim 1, wherein:
the stylus comprises:
a stylus magnet; and
a stylus power module;
the host device comprises:
a host magnet covered by the engagement portion; and
a host power module covered by the engagement portion; and
when the stylus magnet is aligned with the host magnet, the stylus power module is aligned with the host power module.

7. A case comprising:
a main body for surrounding at least a portion of a host device;
a tray configured to slide relative to the main body between:
a retracted configuration with the tray in a first position against the main body;
a securing configuration with the tray in a second position away from the main body for securing a stylus against an engagement portion of the host device; and
an extended configuration with the tray in a third position away from the main body, wherein the second position is between the first position and the third position, wherein the tray is biased to transition from the extended configuration to the securing configuration, wherein the main body and the tray form a detent mechanism to provide a releasably secure arrangement at the retracted configuration and the securing configuration.

8. The case of claim 7, wherein while the tray is in the retracted configuration, a surface of the tray is flush with a surface of the main body.

9. The case of claim 7, wherein the detent mechanism comprises magnets at the main body and the tray.

10. The case of claim 7, wherein the detent mechanism comprises a spring-loaded mechanical detent between the main body and the tray.

11. The case of claim 7, wherein the detent mechanism comprises:
a tray magnet at the tray;
a first magnet at the main body and being configured to attract the tray magnet while the tray is in the retracted configuration;
a second magnet at the main body and being configured to attract the tray magnet while the tray is in the securing configuration; and
a third magnet at the main body and being configured to repel the tray magnet while the tray is in the extended configuration.

12. The case of claim 7, wherein:
the stylus comprises:
a stylus magnet; and
a stylus power module;
the host device comprises:
a host magnet covered by the engagement portion; and
a host power module covered by the engagement portion; and
when the stylus magnet is aligned with the host magnet in the first position, the stylus power module is aligned with the host power module.

13. The case of claim 7, wherein:
the main body comprises:
a rear cover; and
a lip extending from the rear cover; and
the tray comprises:
a base; and
a wall.

14. The case of claim 13, wherein:
the rear cover and the lip define a recess; and
the tray is movable relative to the main body to form a receptacle for receiving the stylus such that the stylus abuts the wall, the base, and the engagement portion of the host device.

15. A case comprising:
a main body comprising:
a rear cover; and
a lip extending from the rear cover, the rear cover and the lip defining a recess for surrounding at least a portion of a host device; and
a tray movably coupled to the main body and comprising:
a base; and
a wall, wherein the tray is movable relative to the main body to form a receptacle for receiving a stylus such that the stylus abuts the wall, the base, and an engagement portion of the host device; and
a tray magnet,
wherein the main body further comprises:
a first magnet configured to attract the tray magnet;
a second magnet configured to attract the tray magnet; and
a third magnet configured to repel the tray magnet.

16. The case of claim 15, wherein a length of the tray extending along the engagement portion of the host device is at least as long as a length of the stylus.

17. The case of claim 15, wherein the tray is moveable relative to the main body between:
a retracted configuration with the tray in a first position against the engagement portion of the host device;
a securing configuration with the tray in a second position forming the receptacle; and
an extended configuration with the tray in a third position away from the engagement portion of the host device, wherein the second position is between the first position and the third position.

18. The case of claim 15, wherein:
the stylus comprises:
a stylus magnet; and a stylus power module;
the host device comprises:
- a host magnet covered by the engagement portion; and
- a host power module covered by the engagement portion; and when the stylus magnet is aligned with the host magnet, the stylus power module is aligned with the host power module.

\* \* \* \* \*